United States Patent [19]
Hatwar

[11] Patent Number: 5,055,364
[45] Date of Patent: Oct. 8, 1991

[54] MAGNETOOPTICAL RECORDING ELEMENT

[75] Inventor: Tukaram K. Hatwar, Penfield, N.Y.

[73] Assignee: Eastman Kodak Company, Rochester, N.Y.

[21] Appl. No.: 435,915

[22] Filed: Nov. 13, 1989

[51] Int. Cl.$^5$ .............................................. G11B 5/66
[52] U.S. Cl. ................................... 428/694; 428/900; 369/13; 369/14
[58] Field of Search ................ 428/694, 900; 360/131, 360/155; 365/122; 369/13, 14

[56] References Cited

U.S. PATENT DOCUMENTS

| | | | |
|---|---|---|---|
| 4,579,777 | 4/1986 | Honguu et al. | 428/694 |
| 4,670,353 | 6/1987 | Sakurai | 428/606 |

FOREIGN PATENT DOCUMENTS

| | | |
|---|---|---|
| 0302393 | 7/1988 | European Pat. Off. |
| 60-253040 | 12/1985 | Japan |
| 61-196444 | 8/1986 | Japan |
| 62-132254 | 6/1987 | Japan |
| 025857 | 2/1988 | Japan |
| 152043 | 6/1988 | Japan |
| 1-017245 | 1/1989 | Japan |

WO88/08192 7/1988 PCT Int'l Appl.

OTHER PUBLICATIONS

McGraw-Hill Encyclopedia of Science & Technology, 6th Ed., vol. 1, "Alloy", pp. 369–378, vol. 4, "Corrosion," pp. 438–446, vol. 19, "Zirconium," pp. 628–631.
T. K. Hatwar et al., "Oxidation Behavior of FeTbCoPt and FeTbCoZr Magneto-Optic Films," Analytical Technology Division, Research Laboratories, Eastman Kodak Company, Rochester, N.Y. 14650.

Primary Examiner—Merrell C. Cashion, Jr.
Assistant Examiner—Robert J. Follett
Attorney, Agent, or Firm—Doreen M. Wells

[57] ABSTRACT

A magnetooptical recording element having improved corrosion and oxidation resistance comprises a substrate and a magnetooptical recording film having a composition represented by the formula:

$$(TbFeCo)_{1-x-y}Zr_xPd_y$$

wherein x and y represent atomic percent, $1 \leq x \leq 15$ and $1 \leq y \leq 15$.

6 Claims, 3 Drawing Sheets

MAGNETOOPTICAL RECORDING ELEMENT

FIELD OF THE INVENTION

This invention relates to a magnetooptical recording element. More particularly, it relates to a magnetooptical recording element having improved corrosion and oxidation resistance.

BACKGROUND OF THE INVENTION

In magnetooptical recording, information in the form of magnetic domains is written on a magnetooptical recording layer having perpendicular magnetic anisotropy. This information is read by irradiating the medium with a linearly polarized laser beam and detecting the change of the incident laser beam caused by the interaction of the light with the magnetization. Kerr rotation, coercivity, sensitivity and carrier to noise ratio (CNR) are critical parameters to be concerned with to achieve high performance magnetooptical recording. The Kerr rotation angle is the amount of rotation of polarized light from incident linearly polarized light when it is reflected from the magnetic media, while the sensitivity of the medium depends upon its coercivity and Curie temperature.

Magnetooptical recording is desirable because it is capable of high density information storage, while also having the capability of being erasable. Currently, rare-earth, transition-metal alloy films are favored as the recording media in magnetooptical recording elements. A useful medium of this type is disclosed in U.S. Pat. No. 4,670,353 issued June 2, 1987 and comprises a TbFeCo alloy.

An inherent disadvantage of such films is that they are highly susceptible to corrosion and oxidation. For example, aging in low humidity, high temperature environments results in uniform oxidation of the film. On the other hand, in high humidity environments, corrosion pits or pinholes are formed which grow in size and number and in time completely destroy the film.

The problem facing the artisan at the time of this invention has been to provide a magnetooptical recording film having improved corrosion and oxidation resistance without significantly adversely affecting the Kerr rotation, CNR, or sensitivity of the recording element.

SUMMARY OF THE INVENTION

I have discovered that a magnetooptical recording media with high corrosion and oxidation resistance can be obtained by alloying TbFeCo with both Zr and Pd without significantly adversely affecting magnetooptical properties.

More particularly, in accordance with this invention there is provided a magnetooptical recording element comprising a substrate and a magnetooptical recording film having a composition represented by the formula:

$$(TbFeCo)_{1-x-y}Zr_xPd_y$$

wherein x and y represent atomic percent,

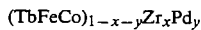

It is an advantageous feature of this invention that the above-described recording film exhibits excellent corrosion and oxidation resistance without significantly adversely affecting the Kerr rotation, CNR, and sensitivity, of the recording element.

It is another advantageous feature of this invention that when both Zr and Pd are added to the TbFeCo, greater corrosion and oxidation resistance are obtained at a lower total concentration than what would be predicted based on the individual effects of Zr and Pd.

Yet another advantageous feature of this invention is that the decreases in Kerr rotation and CNR exhibited by the elements of this invention are much less than what would be predicted from the individual effects of Zr and Pd.

A further advantageous feature of this invention is that a TbFeCo magnetooptic recording media containing Zr and Pd exhibits higher writing sensitivity than a TbFeCo media.

Other advantageous features will become readily apparent upon reference to the following description of preferred embodiments when read in light of the accompanying drawings.

DESCRIPTION OF PREFERRED EMBODIMENTS

This invention is based partly on the discovery that a magnetooptical media having high corrosion and oxidation resistance can be obtained without adversely affecting magnetooptical properties by alloying TbFeCo simultaneously with both Zr and Pd.

This invention is described hereinafter primarily in connection with a magnetooptical recording film containing a TbFeCo alloy. In addition, the invention is useful with other rare earth transition metal alloys.

Figure 4:
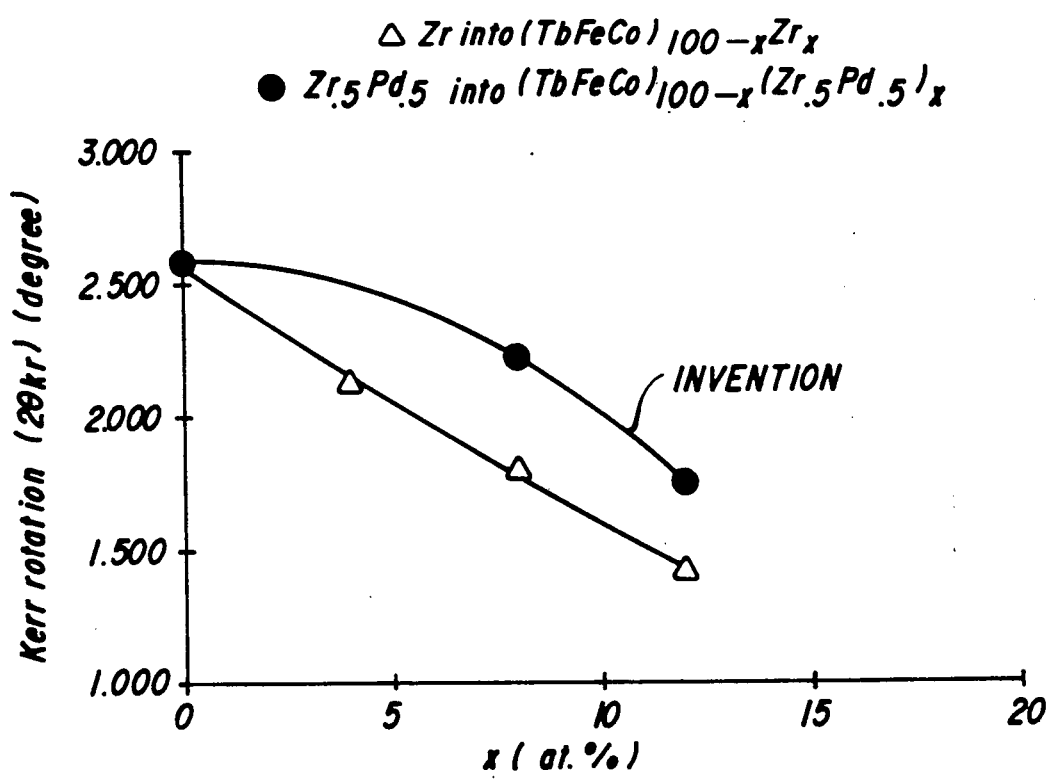
FIG. 4 is a graph showing variation of the Kerr rotation as a function of atomic percent for Zr and ZrPd additions to a TbFeCo recording film.
Figure 5:
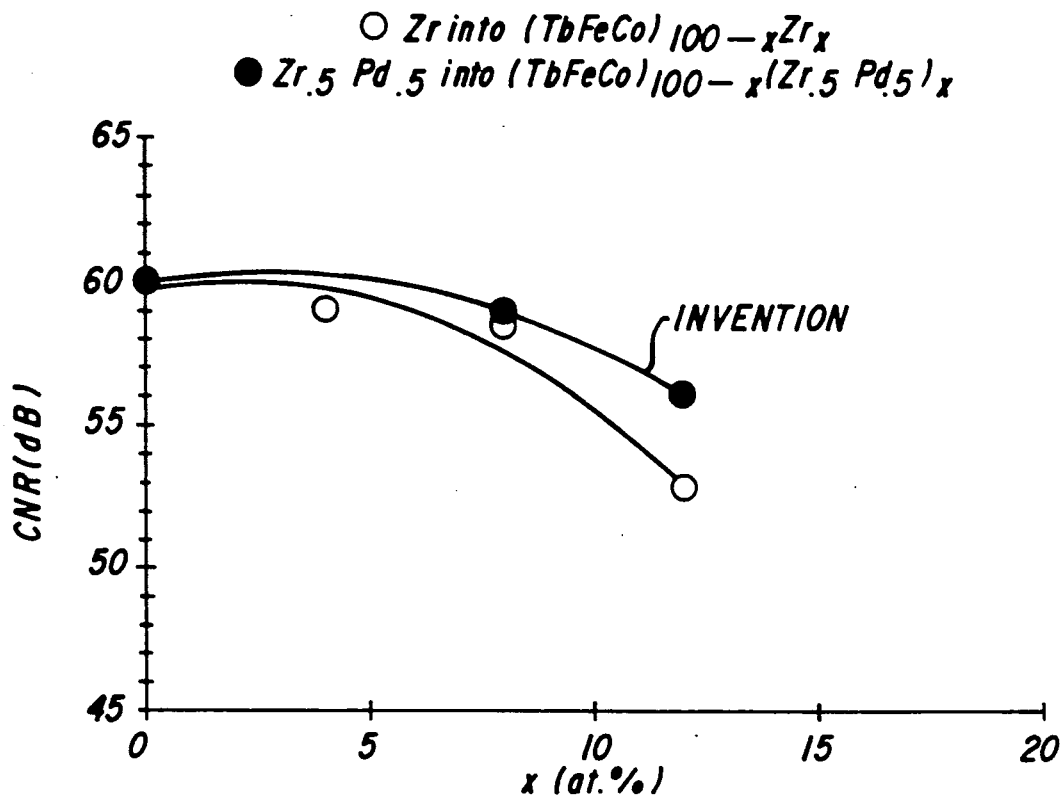
FIG. 5 is a graph showing the variation of the CNR as a function of atomic percent for Zr and ZrPd additions to a TbFeCo recording film.

As stated, the magnetooptical recording film of this invention includes a substrate and a magnetooptical recording film. The film comprises a TbFeCo alloy and further includes both Zr and Pd. A preferred composition is represented by the structural formula set forth in the summary above. In the above formula, x and y represent atomic percentage, $1 \leq x \leq 15$ and $1 \leq y 15$. However, it is preferred that $x+y \leq 12$. The reason for this, as is illustrated in FIGS. 4–5, is that the Kerr rotation and CNR begin to decrease disadvantageously above about 12 atomic percent. In a particularly preferred embodiment of the invention, in the above formula, x<5 and y<5. Such compositions provide optimum performance in terms of improved oxidation and corrosion resistance and magnetooptical properties.

Our investigations have shown that alloying the TbFeCo with Zr improves the resistance of the media against pitting corrosion, however, the oxidation resistance of such a film is less than desirable. On the other hand, alloying TbFeCo with Pd improves the oxidation resistance of the media, much more so than by alloying with Zr. However, the pitting resistance of the TbFe-CoPd film is inferior to that of TbFeCoZr (at similar Pd/Zr concentrations). In order to have an effective resistance against pitting corrosion at least 8 atomic percent Zr is needed. Alloying with such an amount of Zr decreases the Kerr rotation by 32% and the CNR by 2 dB. In order to have an effective oxidation resistance we have found that at least 8 atomic percent Pd in TbFeCo is required. This amount of Pd decreases the Kerr rotation by 22% and the CNR by 6 dB.

I have found that when both Zr and Pd are added to TbFeCo, a synergistic effect is observed such that better corrosion and oxidation resistance are obtained at a low total concentration of these alloying elements. For example, a TbFeCo medium of this invention containing 4 atomic percent Zr and 4 atomic percent Pd has higher corrosion and oxidation resistance than that of a TbFeCo medium containing either 8 atomic percent Zr or 8 atomic percent Pd. In this case, that is, a medium of this invention having the formula $(TbFeCo)_{92}Zr_4Pd_4$, the Kerr rotation and the CNR are reduced by only 13% and 1 dB, respectively. Moreover, the media of this invention have been found to be more sensitive than similar TbFeCo media not containing Zr and Pd.

The optimal total and relative concentrations of Zr and Pd can be determined by one skilled in the art and depend upon the particular TbFeCo alloy selected and the desired magnetooptical properties, CNR, stability and manufacturability of the ultimate recording element and system.

Any suitable method of preparing the magnetooptical recording element in accordance with this invention may be employed which includes deposition of the magnetooptical recording film by any suitable technique such as thermal evaporation, sputtering or the like, which techniques are well known to those skilled in the art. A preferred technique, which is illustrated in the examples which follow, is to prepare the alloy thin films by sputtering from cast alloy targets.

In the preparation of the magnetooptical recording element in accordance with this invention, any suitable substrate can be used. Preferred substrates are substantially inert to deposition conditions and non-magnetic, or so weakly magnetic as not to diminish the magnetic properties of the magnetooptical recording film to be formed thereon. The size and shape of the substrate are not critical. The substrate can be flexible or rigid depending upon its application. For example, the substrate can be in the form of a disk, tape, foil, wire or the like and can be made of any suitable material, such as glass, plastic, including for example acrylic resins such as polymethylmethacrylate, polycarbonate, polyester polyamide resins and the like. Non-magnetic metals such as aluminum and copper can be employed. When the magnetooptical element is to be addressed by a laser through the substrate, the substrate preferably is substantially transparent. Non-transparent substrates can be employed when a laser is to address the magnetooptical media from the side opposite the support.

With respect to the TbFeCo alloy, preferred alloys are described in U.S. Pat. No. 4,670,353, the disclosure of which is hereby incorporated by reference in its entirety. It is preferred that the Tb be present in an amount of about 10 to 30 atomic percent, the Fe be present in an amount of about 50 to 90 atomic percent, and the Co be present in an amount of about 5 to 20 atomic percent, based on the total amount of TbFeCo present. Compositions in this range possess desirable properties for magnetooptical recording, i.e., good anisotropy and thermal stability and a large Kerr rotation angle. However, the invention is useful in conjunction with other TbFeCo alloys outside this range.

In a preferred embodiment of the invention, the above-described magnetooptical recording film is provided with a protective layer or layers to further enhance the stability of the magnetooptical recording film. Such layers can be disposed on one surface or the other, or on both surfaces, of the recording film. The protective layers can further improve the corrosion and oxidation resistance of the magnetooptic layer. Such layers can be formed from elements such as Cr, Mo, W, Ta, Hf, Al, Mg, Zn, Ti, Zr, V and alloys thereof; and from nitrides, oxides or carbides of Al, Si, Ti and B. In a particularly preferred embodiment of this invention, the magnetooptical recording film has on one surface a ceramic barrier layer and on the other surface a self-passivating active metal layer having a thermal conductivity substantially equivalent to that of the ceramic barrier layer such as is described in commonly-owned U.S. application Ser. No. 317,401 entitled MAGNETOOPTICAL RECORDING ELEMENT, filed Mar. 1, 1989 in the names of D. A. Glocker, T. K. Hatwar, G. McIntire, S. T. Rao and D. G. Stinson. These layers can be applied by thermal evaporation, sputtering or other suitable techniques known in the art.

Figure 6:
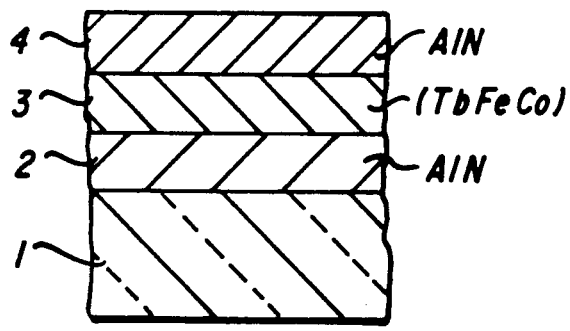
FIG. 6 is a schematic partial cross-sectional view of one example of a magnetooptical recording element of this invention.

A preferred embodiment of this invention is illustrated in FIG. 6. Disposed in order on substrate 1 is protective layer 2 and magnetooptic recording film 3. Magnetooptic recording film 3 is provided with protective layer 4. The thickness of the magnetooptical recording film can be in the range suitable for use as a magnetooptical recording medium. The thickness of the film can range from 100–2000 Å. The thickness of the protective layers and substrate can vary widely depending on the particular application. The protective layers can be, for example, about 1000 Å thick.

An essential feature of this invention is the presence of both alloying elements, Zr and Pd, in combination with a TbFeCo alloy in a recording film. The presence of both Zr and Pd provides unexpected synergistic effects. However, the reason that these elements provide such synergistic effects is not completely understood. While applicant does not wish to be bound by theoretical mechanisms, based on extensive studies and results from X-ray photoelectron techniques, it is believed that Zr, an active metal, diffuses to the surface and forms a passivating oxide on the recording film, suppressing pitting corrosion. On the other hand, Pd, a noble metal, is believed to reduce the adsorption of oxygen at the alloy surface and/or retard the overall kinetics of the alloy. Based on our understanding, it is hypothesized that Zr can be replaced with other active metals such as Ti, V, Cr, Mn, Y, Nb, Mo, Hf, Ta, W and Al and that Pd can be replaced with other noble metals such as Ni, Co, Rh, Ag, Ir, Pt and Au to achieve corrosion and oxidation resistance. However, it is not believed that other combinations will provide the advantages discussed herein to the extent provided by the combination of Zr and Pd.

EXAMPLES

The following examples further illustrate the invention.

Alloy thin films were prepared by sputtering from vacuum cast alloy targets, 2" in diameter, using a d.c. magnetron gun in an Ar atmosphere. The alloy target and film compositions are given in Table 1.

TABLE 1

| Example | Target Composition* (at %) | Film Composition* (at %) | 2Θk (degree) | CNR (dB) | ORP (mW) |
|---|---|---|---|---|---|
| A | $Tb_{27}Fe_{64}Co_9$ | $Tb_{20}Fe_{70}Co_{10}$ | 2.6 | 60 | 5.9 |
| B | $(Tb_{27}Fe_{64}Co_9)_{90}Zr_{10}$ | $(Tb_{20}Fe_{70}Co_{10})_{92}Zr_8$ | 1.8 | 58 | 3.8 |
| C | $(Tb_{27}Fe_{64}Co_9)_{93}Pd_7$ | $(Tb_{20}Fe_{70}Co_{10})_{92}Pd_8$ | 2.0 | 54 | 4.7 |
| 1 | $(Tb_{27}Fe_{64}Co_9)_{91}Zr_5Pd_4$ | $(Tb_{20}Fe_{70}Co_{10})_{92}Zr_4Pd_4$ | 2.2 | 59 | 4.3 |

*Measured by inductively coupled plasma spectroscopy.

Films were deposited on glass substrates mounted on a water-cooled holder rotating at 7 rpm. The sputtering chamber was initially evacuated to $1\times10^{-6}$ Torr and backfilled with argon to 3 mTorr. Typical deposition parameters were: sputtering power, 150 W; target to substrate distance, 5". Deposition rate under these conditions was 5 Å/sec. For the corrosion and oxidation measurements no protective overcoat was deposited on the magnetooptic (MO) layer, so that the effectiveness of the alloying elements could be distinguished. In other experiments, MO disks were produced under identical deposition conditions on a glass substrate with AlN as an underlayer and an overcoat. The thickness of the magnetooptical recording layer was 1000 Å and the thickness of each AlN layer was 1000 Å. The Kerr rotations and CNR were measured. The AlN layer was deposited in an $Ar+N_2$ atmosphere by d.c. reactive sputtering from an Al target. All three layers in the trilayer structure were deposited sequentially without breaking the vacuum.

Figure 1:
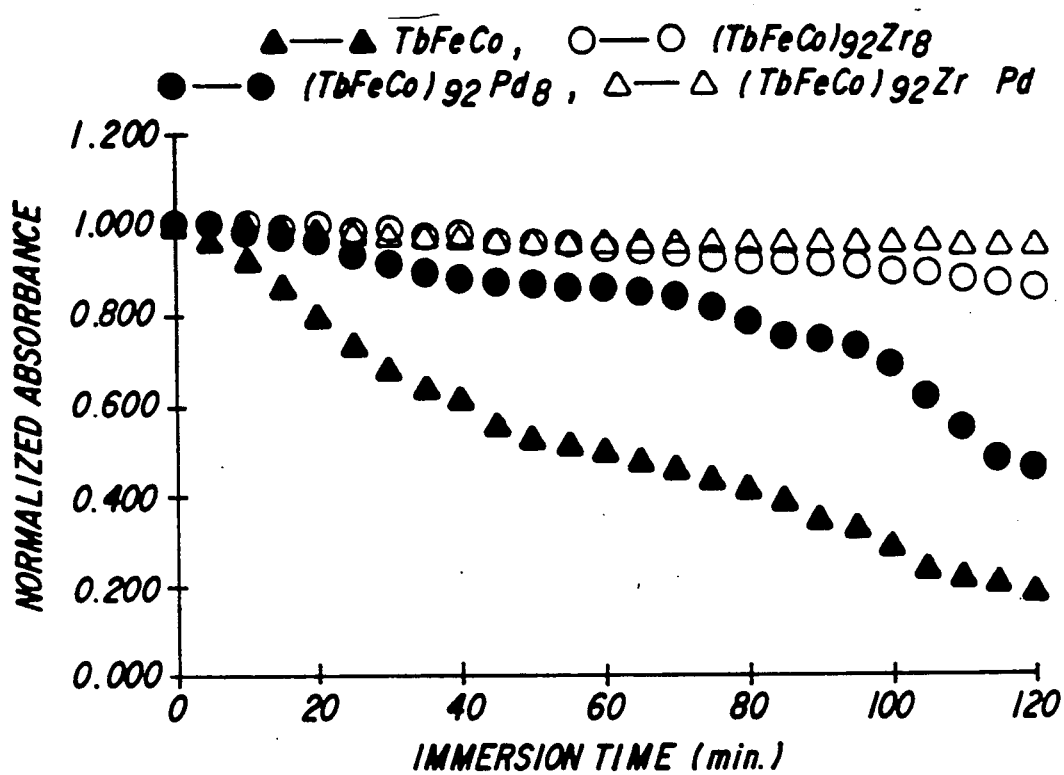
FIG. 1 is a graph showing normalized optical absorption, which is a measure of pitting corrosion resistance, as a function of immersion time in a 0.005M KCl/chloroacetate buffer solution for various TbFeCo recording films, including a film of this invention containing both Zr and Pd.

The electrochemical corrosion causing pinhole formation or pitting was evaluated by measuring the changes in the optical absorption of the film immersed in a buffer solution. The normalized absorption for TbFeCo, $(TbFeCo)_{92}Pd_8$, $(TbFeCo)_{92}Zr_8$ and $(TbFeCo)_{92}Zr_4Pd_4$ are shown in FIG. 1 as a function of immersion time in 0.005M KCl/chloroacetate buffer solution. The TbFeCo film showed a marked decrease in absorption in a very short time. Corrosion pits appeared almost immediately after immersion and grew rapidly with time and the film completely dissolved in 2.0 hours. Films containing Zr or Pd exhibited a lower rate of decrease in absorption thus indicated higher corrosion stability of these films. It is also evident from that figure that a $(TbFeCo)_{98}Zr_8$ film has higher corrosion resistance than a $(TbFeCo)_{98}Pd_8$ film, but the $(TbFeCo)_{92}Zr_4Pd_4$ film showed the slowest rate of decrease in absorption. Thus, the $(TbFeCo)_{92}Zr_4Pd_4$ film is expected to be more stable in high humidity environments compared to films containing just one of these alloying elements and compared to films not containing either of these alloying elements.

Figure 2:
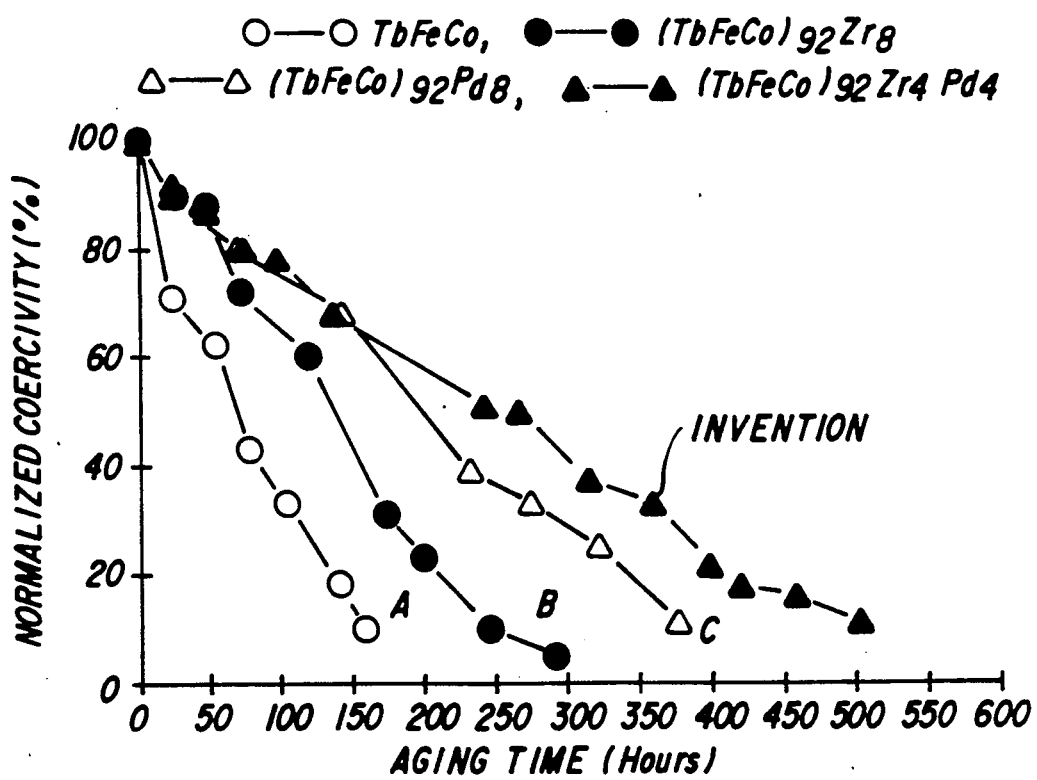
FIG. 2 is a graph showing normalized coercivity as a function of aging time for various TbFeCo recording films including a film of this invention containing both Zr and Pd.
Figure 3:
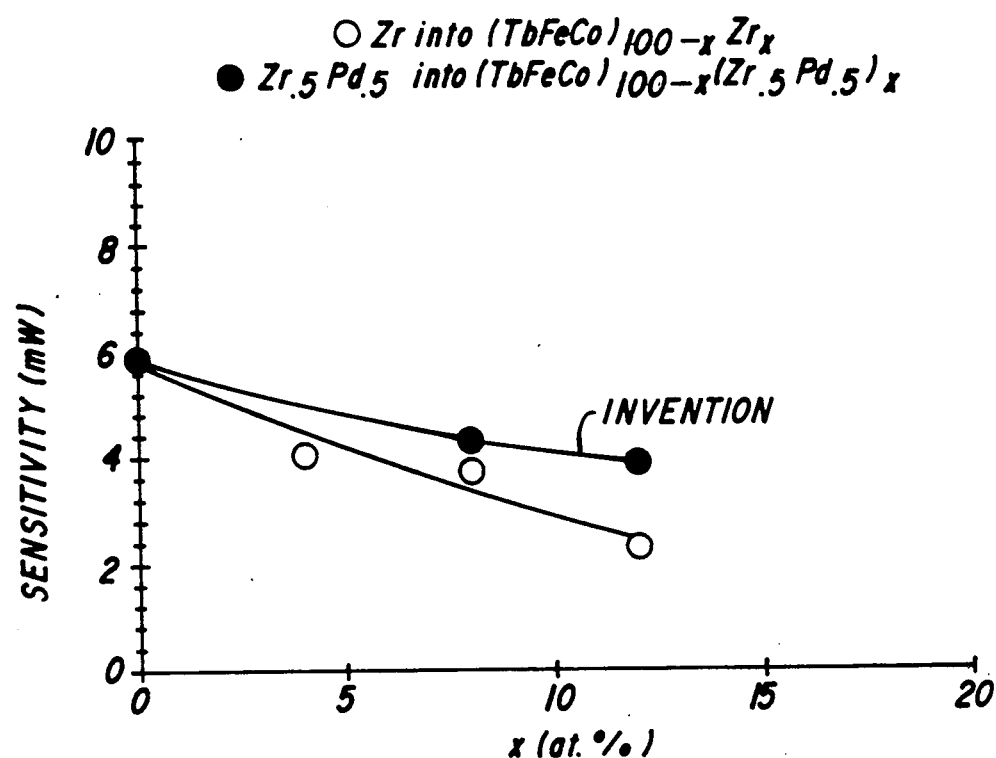
FIG. 3 is a graph showing the optimum recording power (ORP) as a function of atomic percent for Zr and ZrPd additions to a TbFeCo recording film.

Changes in MO properties were monitored by measuring the Kerr hysteresis loop as a function of aging time. The normalized coercivity is plotted as a function of aging time in FIG. 2 for various alloys. A fast decrease in the coercivity was observed for the TbFeCo film and the MO properties were completely degraded in 150 hrs. Addition of 8 atomic percent of Zr or Pd to TbFeCo retarded the oxidation of the film as shown by the curves B and C in FIG. 5. It is also evident that a $(TbFeCo)_{92}Pd_8$ film has a higher oxidation resistance than that of a $(TbFeCo)_{92}Zr_8$ film. It is noted that the TbFeCo film containing both 4 atomic percent Zr and 4 atomic percent Pd (i.e., $(TbFeCo)_{92}Zr_4Pd_4$) retained MO properties for the longest period of time indicating the highest oxidation resistance for this film.

Polar Kerr rotation was measured from the front surface of the disk. The remnant Kerr rotations for various alloy films are given in Table 1. It is evident that a $(TbFeCo)_{92}Zr_4Pd_4$ medium has higher Kerr rotation than that of either $(TbFeCo)_{92}Zr_8$ or $(TbFeCo)_{92}Pd_8$.

The dynamic measurements of the disks (from the front surface) were made under the following test conditions: 7 m/sec disk velocity, 1 MHz carrier frequency, 50% duty cycle, 30 kHz bandwidth, 300 Oerstead bias magnetic field, and 1.4 mW read power. The maximum CNR and the optimum recording power (ORP) are included in Table 1 which indicates that $(TbFeCo)_{92}Zr_4Pd_4$ medium has a CNR comparable to a TbFeCo disk. It is also evident that $(TbFeCo)_{92}Zr_4Pd_4$ is more sensitive to laser writing than the TbFeCo film.

According to this invention, MO media with high corrosion and oxidation resistance can be obtained by alloying TbFeCo with both Zr and Pd and yet without significantly sacrificing the MO properties. Further, the corrosion and oxidation protection provided by both Zr and Pd are unexpectedly greater than the anticipated additive effects of both elements. The decrease in Kerr rotation and CNR is also much less than would be predicted from a knowledge of the individual effects of Zr and Pd. Further still, a $(TbFeCo)_{92}Zr_4Pd_4$ medium has higher writing sensitivity than a TbFeCo medium.

The invention has been described in detail with particular reference to preferred embodiments thereof, but it will be understood that variations and modifications can be effected within the spirit and scope of the invention.

What is claimed is:

1. A magnetooptical recording element comprising a substrate and a magnetooptical recording film having a composition represented by the formula:

$$(TbFeCo)_{1-x-y}Zr_xPd_y$$

wherein x and y represent atomic percent, $1 \leq x < 5$ and $1 \leq y < 5$.

2. The element of claim 1 wherein $x+y<10$.

3. The element of claim 1 wherein said recording film has the composition $(Tb_{20}Fe_{70}Co_{10})_{92}Zr_4Pd_4$.

4. The element of claim 1 wherein said recording film has on one surface thereof a protective layer comprising Ti, Zr, V or alloys thereof; or a nitride or carbide of Al, Si, Ti or B.

5. The element of claim 1 wherein said recording film has on both surfaces thereof a layer comprising AlN.

6. The element of claim 1 wherein said recording film has on one surface of a protective layer of AlN and on the other surface thereof a layer of Ti.

* * * * *